(12) United States Patent
Ito et al.

(10) Patent No.: US 7,995,161 B2
(45) Date of Patent: Aug. 9, 2011

(54) SURFACE LIGHT SOURCE AND LIQUID CRYSTAL DISPLAY INCLUDING THE SAME

(75) Inventors: Shin Ito, Mihara (JP); Masato Sumikawa, Kashihara (JP); Yutaka Okada, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 320 days.

(21) Appl. No.: 12/338,722

(22) Filed: Dec. 18, 2008

(65) Prior Publication Data

US 2009/0167989 A1 Jul. 2, 2009

(30) Foreign Application Priority Data

Dec. 28, 2007 (JP) .................... 2007-338458

(51) Int. Cl.
*G02F 1/1335* (2006.01)
(52) U.S. Cl. ............... 349/65; 349/61; 349/62
(58) Field of Classification Search ............ 349/62, 349/66, 65
See application file for complete search history.

(56) References Cited

U.S. PATENT DOCUMENTS

| | | | | |
|---|---|---|---|---|
| 6,808,281 B2* | 10/2004 | Ho | .................. | 362/600 |
| 6,867,829 B2* | 3/2005 | Chiou | ............. | 349/66 |
| 6,975,370 B2* | 12/2005 | Yu et al. | ........... | 349/65 |
| 7,494,234 B2* | 2/2009 | Chang | ............ | 362/19 |
| 7,630,025 B2* | 12/2009 | Park et al. | ........ | 349/64 |
| 7,641,360 B2* | 1/2010 | Chou et al. | ........ | 362/235 |
| 2004/0095743 A1* | 5/2004 | Yu et al. | ........... | 362/31 |
| 2004/0114343 A1* | 6/2004 | Ho | .................. | 362/31 |
| 2006/0077689 A1* | 4/2006 | Lin | ................ | 362/613 |
| 2008/0002429 A1* | 1/2008 | Noba | ............. | 362/612 |

FOREIGN PATENT DOCUMENTS

JP 2005-71971 3/2005

* cited by examiner

*Primary Examiner* — Rhonda S Peace
(74) *Attorney, Agent, or Firm* — Morrison & Foerster LLP

(57) ABSTRACT

A surface light source includes a light source and an optical waveguide plate. The light source serves to emit light. The optical waveguide plate has an incident end face where the light is incident and a light exit surface where the light incident on the incident end face exits. Further, the optical waveguide plate has a refractive index n. The incident end face has a plurality of concave portions. The angle between a plane formed by the plurality of concave portions and a tangent plane of the incident end face is not more than $(90 - 2 \cdot \arcsin(1/n))$ degree.

5 Claims, 8 Drawing Sheets

US 7,995,161 B2

SURFACE LIGHT SOURCE AND LIQUID CRYSTAL DISPLAY INCLUDING THE SAME

This nonprovisional application is based on Japanese Patent Application No. 2007-338458 filed on Dec. 28, 2007 with the Japan Patent Office, the entire contents of which are hereby incorporated by reference.

BACKGROUND OF THE INVENTION

1. Field of the Invention

The present invention relates to a display including a surface light source having an optical waveguide plate, and a display panel whose rear surface is illuminated by the surface light source.

2. Description of the Background Art

As a surface light source such as backlight illuminating a liquid crystal display panel from behind, a surface light source has been known that includes a light source such as LED and an optical waveguide plate, where the light from the light source is received at an incident end face of the optical waveguide plate and then diffused and emitted. It is preferable that such a surface light source exhibits a uniform emission intensity over the whole light exit surface. A problem here, however, is that the emission intensity is not uniform in the vicinity of the incident end face.

Japanese Patent Laying-Open No. 2005-071971 discloses a surface light source configured to solve the above-described problem, where a plurality of prisms are formed at an incident end face, and the distance between the prisms adjacent to each other and the inclination angle of the prisms are appropriately adjusted. It is disclosed that a darkened portion formed near the incident end face can be accordingly reduced.

As for the surface light source disclosed in the above-referenced publication, however, improvement in uniformity of the emission intensity is insufficient. Further, leakage light from the side end face of the optical waveguide plate is not considered. Therefore, if light leaks from this portion, a problem of deterioration in light use efficiency arises.

SUMMARY OF THE INVENTION

A surface light source of the present invention includes a light source and an optical waveguide plate. The light source serves to emit light. The optical waveguide plate has an incident end face where the light is incident and a light exit surface where the light incident on the incident end face exits. The optical waveguide plate has a refractive index n. The incident end face has a plurality of concave portions. An angle between a plane formed by the plurality of concave portions and a tangent plane of the incident end face is not more than (90−2·arcsin(1/n)) degree.

Preferably, the light source is provided at a position apart from the optical waveguide plate, with respect to the tangent plane of the incident end face.

Preferably, the plurality of concave portions are each arc-like-shaped.

Preferably, the plurality of concave portions are each triangle-shaped.

A liquid crystal display of the present invention includes the above-described surface light source and a liquid crystal display panel. The liquid crystal display panel has a rear surface illuminated by the surface light source.

With the surface light source of the present invention, the emission intensity in the vicinity of the incident end face of the surface light source can be made uniform, and deterioration in light use efficiency can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

<Light Emitting Device>

Figure 1A:
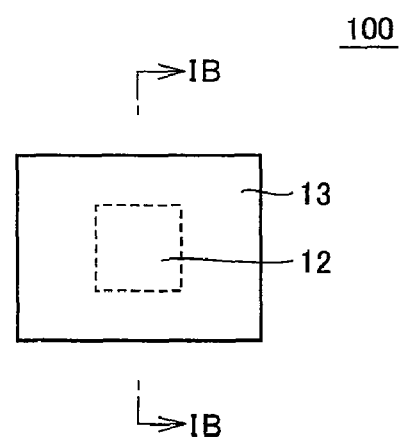
FIG. 1A is a diagram showing a shape of a light emitting device in a first embodiment of the present invention.
Figure 1B:
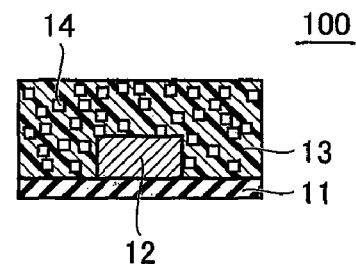
FIG. 1B is a cross-sectional view along line IB-IB in FIG. 1A.

Referring to FIGS. 1A and 1B, a light emitting device 100 that is a light source has a package form of so-called resin mold type package, and includes a substrate 11, a chip 12 die-bonded onto the substrate and a resin 13 covering these components, and a phosphor 14 is dispersed in advance in resin 13.

Chip 12 is a nitride semiconductor light-emitting device emitting a primary light that is a blue light with an emission peak wavelength of approximately 450 nm.

Substrate 11 is formed of a highly thermally-conductive material for the purpose of immediately dissipating heat that is generated when chip 12 is driven. Preferably, a high heat-dissipation material such as ceramic is used for the substrate. Further, the substrate includes conductive lines or the like formed in advance for energizing chip 12.

For resin 13, a silicone resin or the like having a high endurance against a primary light and a secondary light is preferably used. In resin 13, phosphor 14 absorbing the primary light to emit a secondary light of a different wavelength from that of the primary light is dispersed in advance.

For phosphor 14, a yellow phosphor absorbing the primary light to emit a secondary light that is a yellow light with a peak wavelength of approximately 560 nm can be used.

Further, instead of the above-described yellow phosphor, a red phosphor and a green phosphor absorbing the primary light to emit a red secondary light and a green secondary light respectively can be used.

Light emitting device 100 is configured to emit a white emission light that is a mixture of a primary light emitted from the chip and a secondary light, where the primary light passes through resin 13, and phosphor 14 dispersed in the resin absorbs a part of the primary light to emit the secondary light.

Further, instead of chip 12 emitting the blue light, a chip emitting a primary light that is a UV light and phosphors absorbing the primary light to emit a red secondary light, a green secondary light and a blue secondary light may be used in combination.

Thus, at least two or more different types of phosphors are dispersed in resin 13, so that the spectrum distribution of the emitted light can include a sufficient red component, and the color rendering properties can be improved as compared with the case where only the yellow phosphor is used.

The angle dependence of the emission intensity of light emitting device 100 is represented using cos θ with respect to angle θ to the direction of the normal to the light exit surface, namely the optical axis, of the light emitting device, which is called Lambertian distribution. According to this distribution, the component in the optical axis direction has the highest emission intensity, while side components have the emission intensity that gradually decreases as the angle increases.

As for light emitting device 100, while total internal reflection occurs on the surface of substrate 11 and the external surface of the package, a reflection member such as reflector surrounding chip 12 is not included in the light emitting device. Therefore, while the directivity of the emitted light is relatively wider, the light extraction efficiency is high because the amount of the light component returned due to multiple reflection into the package and accordingly attenuated is small.

Figure 2A:
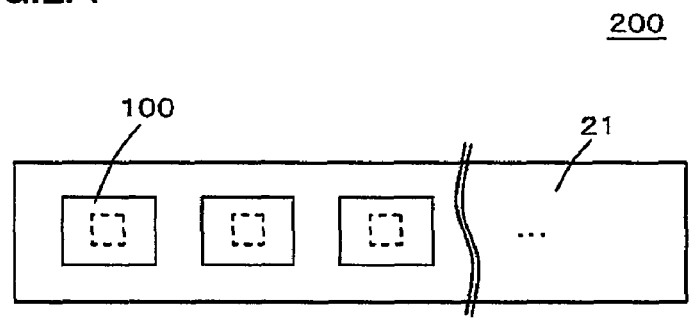
FIGS. 2A and 2B are each a diagram showing a shape of an array light source in the first embodiment of the present invention.
Figure 2B:
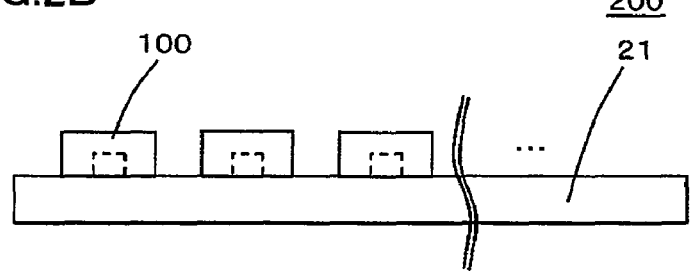

Referring to FIGS. 2A and 2B, an array light source 200 includes a mounting substrate 21 and a plurality of light emitting devices 100 disposed linearly on the substrate, is designed such that the emitted light is taken in along one side of an optical waveguide plate which is described hereinlater, and has the shape of a strip. Mounting substrate 21 is formed of a high thermal-conductivity material in order to immediately dissipate heat generated from light emitting device 100, and a high heat-dissipation material such as aluminum is preferably used for the substrate. Further, conductive lines or the like are formed in advance for energizing light emitting device 100.

Here, light emitting device 100 may be configured by integrally packaging three or more different types of chips that respectively emit a blue light, a green light and a red light, so that the lights are mixed into a white light that is to be emitted. Alternatively, light emitting device 100 may be the one emitting any of a blue light, a green light and a red light, and light emitting devices emitting respective lights may be combined to configure array light source 200. With any of the configurations, respective colors of the lights emitted from light emitting device(s) 100 are mixed while the lights travel in the optical waveguide plate, so that color unevenness is further alleviated.

<Optical Waveguide Plate>

Figure 3A:
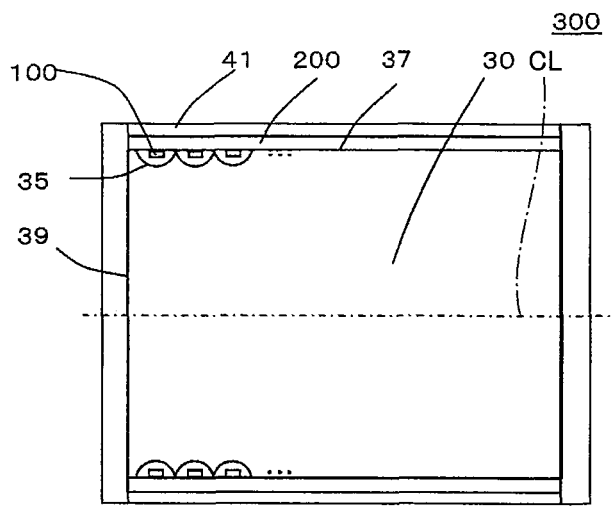
FIGS. 3A to 3C are each a diagram showing a structure of a surface light source in the first embodiment of the present invention.
Figure 3C:
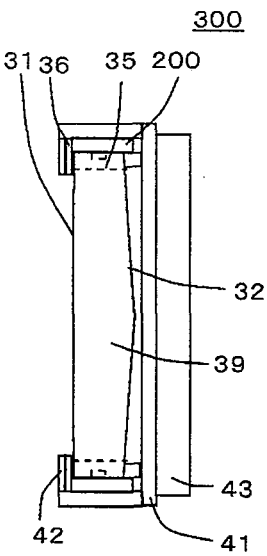
Figure 3B:
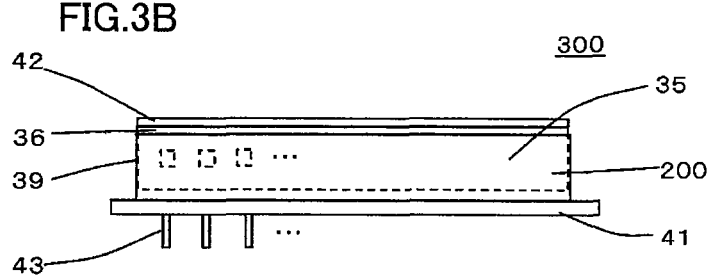

Referring to FIGS. 3A to 3C, a surface light source 300 includes an optical waveguide plate 30 that receives light emitted from array light source 200, diffuses and emits the light, and a material of high transparency such as polycarbonate or acrylic is preferably used for the optical waveguide plate. In optical waveguide plate 30, for the purpose of extracting the emission light and achieving in-plane uniformity of the emission intensity, scattering particles (not shown) of silica, polymer or the like that scatter the light within the optical waveguide plate are dispersed.

Optical waveguide plate 30 is rectangular in plan view, and includes a light exit surface 31 that is a side from which light exits, a rear surface 32, incident end faces 35 that are a pair of end faces extending in the longitudinal direction of optical waveguide plate 30 and opposite to each other in the up-and-down direction, and reflection side surfaces 39 that are a pair of end faces extending perpendicularly to the incident end faces and opposite to each other in the side-to-side direction of optical waveguide plate 30.

Light exit surface 31 is flat. In contrast, rear surface 32 has the maximum thickness in the vicinity of a centerline CL, and is inclined such that the thickness decreases toward the top end and the bottom end of optical waveguide plate 30. Therefore, optical waveguide plate 30 is a flat pentagon in shape and is substantially wedge-shaped in a cross section in the up-and-down direction, except for the portion of for example incident end faces 35 which will be described hereinlater.

On an incident tangent plane 37 extending along one side on each of the top and bottom ends of optical waveguide plate 30, incident end face 35 is formed with a plurality of successive concave arcs located at the same intervals as light emitting devices 100 mounted on array light source 200 which is placed opposite to incident end face 35.

As for the method for manufacturing optical waveguide plate 30, there is a method according to which a plate whose cross section is a flat pentagon in shape is formed in advance by extrusion, and subsequently incident end face 35 is formed on incident tangent plane 37. As for the method for forming incident end face 35, the shape of concave arcs can be formed by laser machining. The incident end face can also be formed by cutting incident tangent plane 37 using a cutting device having a concave-arc-shaped blade.

Alternatively, the optical waveguide plate can also be manufactured by compression molding using a female die having a shallow-dish-shaped concave that is the shape of optical waveguide plate 30.

It should be noted that a chief characteristic of the present invention is that incident end face 35 has a predetermined shape, and therefore, the shape of optical waveguide plate 30 is not limited to the above-described one. For example, rear surface 32 of optical waveguide plate 30 may have an inclined surface where the thickness in the vicinity of the centerline is the smallest thickness and the thickness increases toward the top and bottom ends of optical waveguide plate 30. Further, optical waveguide plate 30 may have an inclined surface where the thickness monotonously decreases toward one of the top and bottom ends of optical waveguide plate 30, and array light source 200 which will be described hereinlater is provided on one of the ends. Furthermore, light exit surface 31 and rear surface 32 may extend in parallel.

Moreover, for the purpose of extracting the emission light and achieving in-plane uniformity of the emission intensity, a dot pattern or texture pattern may be formed on rear surface 32 of optical waveguide plate 30, instead of providing scattering particles as described above. Further, for the purpose of extracting the emission light, a reflection sheet may be provided on rear surface 32.

<Surface Light Source>

Referring to FIGS. 3A to 3C, surface light source 300 includes, for example, a frame 41, array light source 200 provided thereon and optical waveguide plate 30 receiving light from the light source and diffusing and emitting the light.

At the top and bottom ends of frame 41 respectively, array light sources 200 are provided on respective planes that extend substantially upright along respective sides and face each other. Between the pair of array light sources 200 provided respectively at the top and bottom ends of frame 41, optical waveguide plate 30 is provided. The light exit surface of light emitting device 100 is opposite to incident end face 35 of optical waveguide plate 30, so that the light is incident almost perpendicularly to the incident end face. Between incident end face 35 and light emitting device 100, a gap is provided where a dimensional change of optical waveguide plate 30 due to a change in ambient temperature can be absorbed.

As for frame 41, in order to support for example array light source 200 and optical waveguide plate 30 and suppress a temperature increase of surface light source 300, preferably a metal or the like of high mechanical strength and high heat dissipation is preferably used for forming the frame.

Further, frame 41 has a surface where ribs 43 forming ridges and grooves are provided, so that the surface area contributing to heat dissipation as well as the mechanical strength increase, and frame 41 can be made thinner. Here, ribs 43 are arranged in the top-and-bottom direction so that heat is dissipated by convection from the bottom toward the top of frame 41, which is further effective.

At the top end and the bottom end of optical waveguide plate 30 respectively, reflection members 36 are provided each covering the portion between array light source 200 and incident end face 35. Thus, the light emitted from array light source 200 is reflected by reflection member 36 and is efficiently guided into optical waveguide plate 30.

Optical waveguide plate 30 is loosely attached in such a manner that the ends of optical waveguide plate 30 are held by clips 42 provided at respective portions extending substantially upright with respect to and along respective sides at the top and bottom ends of frame 41, so that a dimensional change of and impact on optical waveguide plate 30 due to a change in ambient temperature can be absorbed.

In the following, functions and effects of surface light source 300 will be described.

Figure 5A:
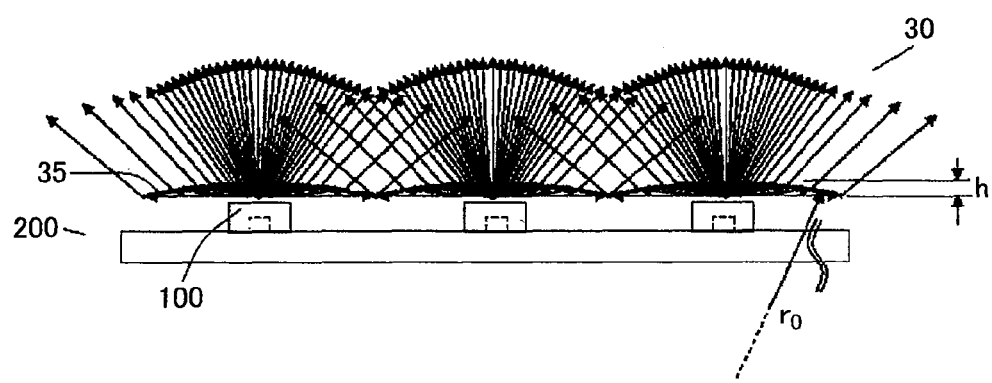
FIG. 5A is a diagram showing trajectories of light in the case where an incident end face is concave-arc shaped in the first embodiment of the present invention.

Referring to FIG. 5A, array light source 200 is disposed such that a plurality of light emitting devices 100 mounted on the array light source and incident end face 35 formed on incident tangent plane 37 (FIG. 3A) and having a plurality of successive concave arcs face each other.

The light emitted from light emitting device 100 is incident directly on incident end face 35, or reflected by reflection member 36 (FIGS. 3B, 3C) covering the gap and subsequently incident on optical waveguide plate 30, travels in optical waveguide plate 30 while scattered by the scattering particles included in the optical waveguide plate, and exits directly from light exit surface 31 (FIG. 3C) of optical waveguide plate 30 or exits therefrom after reflected from the inclined surface.

In the following, effects of surface light source 300 will be described.

One effect is suppression of bright lines, which is achieved by forming incident end face 35 in a concave shape, for example, a concave arc shape.

Here, bright lines will be explained in the following.

Figure 6A:
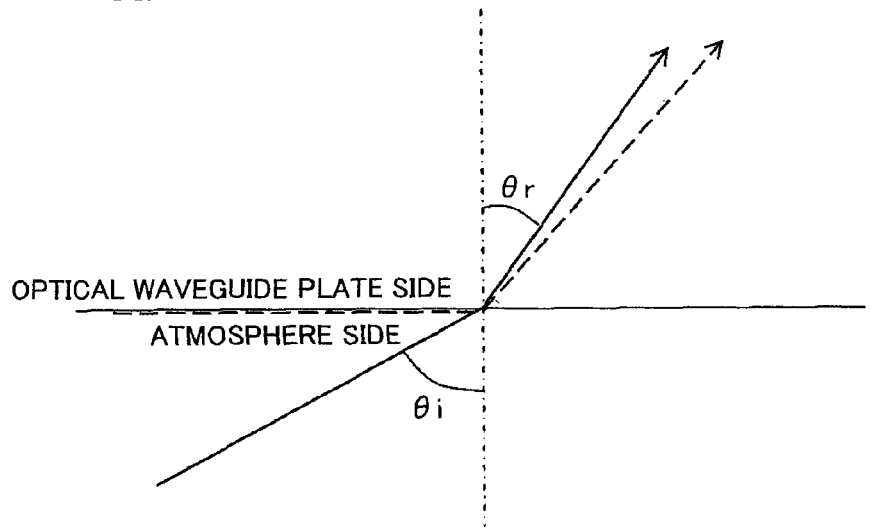
FIGS. 6A and 6B are respectively a diagram and a graph showing a relation between an angle of incidence and an angle of reflection on an interface between the atmosphere and an optical waveguide plate with a refractive index of n=1.59.
Figure 6B:
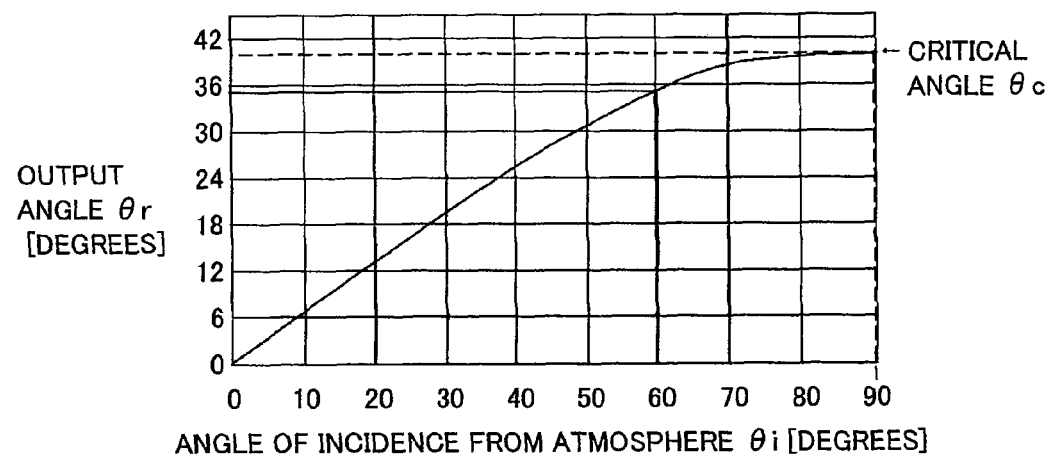

Referring to FIGS. 6A and 6B, it is supposed here that, on incident end face 35 (FIG. 5A), the angle of incidence on optical waveguide plate 30 is θi and the output angle is θr. In accordance with the Snell's law, as θi is increased from zero degree to 90 degrees, θr is also increased with the increase of θi. When θi is 90 degrees, θr is critical angle θc which is the upper limit. For example, when it is supposed that the refractive index of the optical waveguide plate is n=1.59, the critical angle is θc=arcsin(1/n)=39 degrees. As θi is increased from zero degree to 60 degrees, θr is accordingly increased from zero degree to 33 degrees. Therefore, for every increase of θi by one degree, θr is increased by 0.55 degree. Similarly, as θi is increased from 60 degrees to 90 degrees, θr is accordingly increased from 33 degrees to 39 degrees. Therefore, for every increase of θi by one degree, θr is increased by 0.2 degree.

As seen from the above, while θr initially increases linearly, the increment gradually decreases as θi is further increased. In other words, the light density increases as θr approaches θc and therefore, in the case where incident end face 35 is a flat surface, the light traveling with an output angle around θc causes bright lines.

Figure 5B:
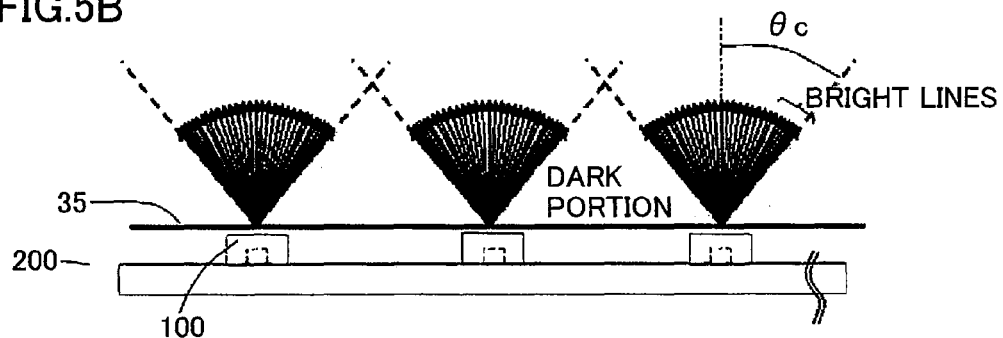
FIG. 5B is a diagram showing trajectories of light in the case where the incident end face is a flat surface in a comparative example.

For example, as shown in FIG. 5B, in the case where incident end face 35 is a flat surface, bright lines are generated for the reason as described above. Further, a dark portion is generated in a region located out of a conical region formed by a region less than critical angle θc with respect to the normal to the interface.

In the following, functions in the case where incident end face 35 is concave-arc-shaped in cross section will be described using drawings and formulas.

Figure 7:
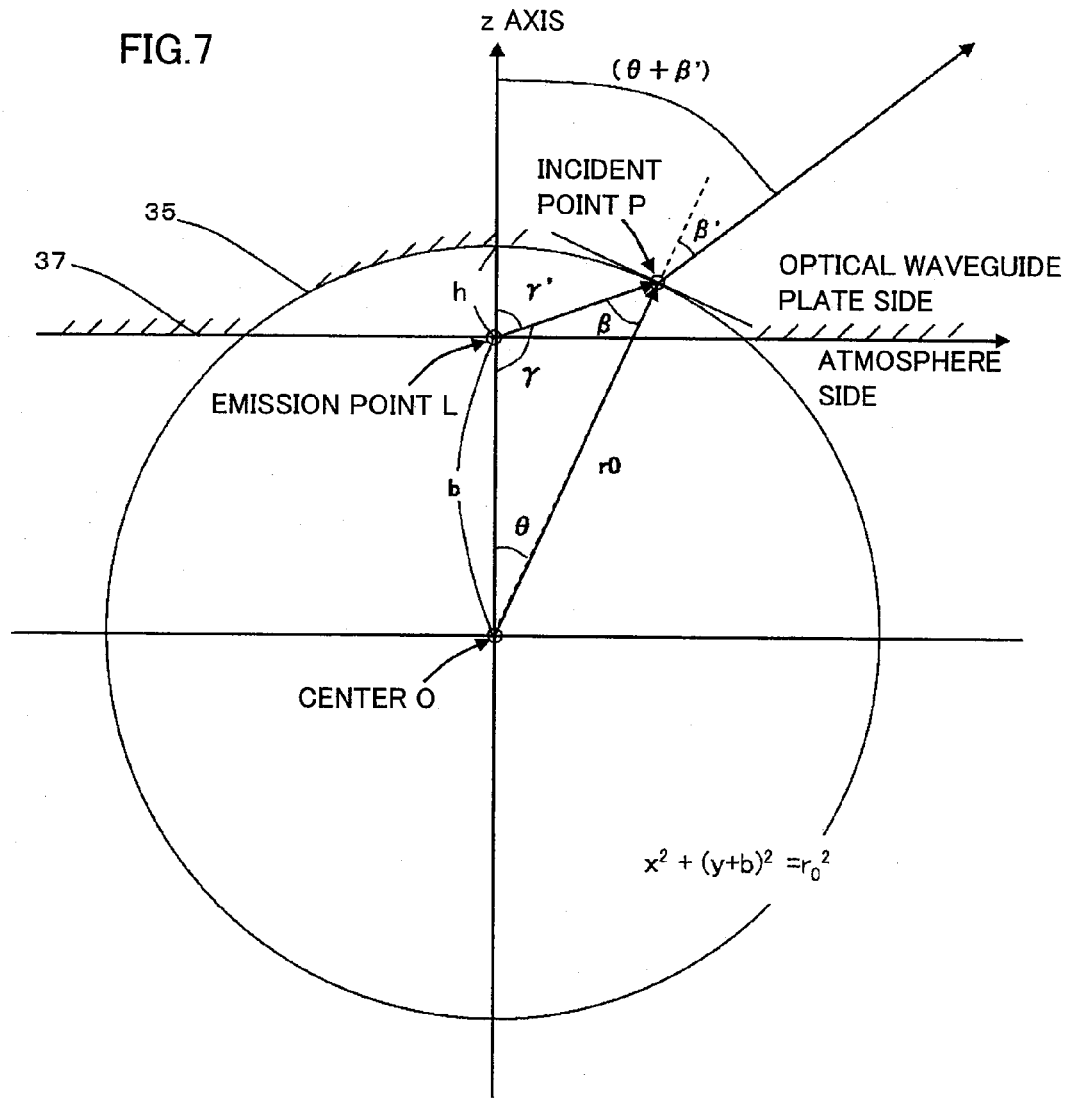
FIG. 7 is a diagram illustrating a trajectory of light in the case where an incident end face is concave-arc-shaped.

Referring to FIG. 7, optical waveguide plate 30 has incident tangent plane 37 where incident end face 35 is formed. For illustrative purpose, FIG. 7 shows the light source as a point light source and shows only one concave arc of the incident end face.

Incident end face 35 is a plane formed of an arc whose center is O and radius of curvature is r0, and the depth is h. Further, it is supposed that the line which is a normal to incident tangent plane 37 and passes through center O is z-axis. It is also supposed that emission point L of the point light source is located at the point of intersection of incident tangent plane 37 with the z-axis. It is further supposed that the point where the light emitted with output angle γ' from emission point L intersects incident end face 35 is incident point P.

Since γ and γ' are supplementary angles, the addition theorem is applied as follows.

$$\sin \gamma = \sin \gamma'$$

For the triangle OLP, the sine theorem is applied as follows.

$$r0/\sin \gamma = b/\sin \beta$$

The formula is rearranged as follows.

$$\sin \beta = (b/r0) \cdot \sin \gamma' \quad (1)$$

The Snell's law is applied as follows.

$$\sin \beta = n \cdot \sin \beta'$$

Accordingly, the following formula is derived.

$$\sin \beta' = (1/n) \cdot \sin \beta \quad (2)$$

-continued $$= (1/n) \cdot (b/r0) \cdot \sin\gamma'$$

As $\beta+\theta=\gamma'$, the following formula is derived.

$$\theta=\gamma'-\beta \quad (3)$$

As γ' is determined following formulas (1) to (3), θ and β' are accordingly determined. In other words, the angle formed by the light traveling in optical waveguide plate 30 with the z axis (angle: θ+β') is uniquely determined relative to output angle γ' of the light emitted from emission point L.

Trajectories of the light determined by the above-described method are shown in FIG. 5A. It is seen that incident end face 35 is concave-arc-shaped to make the light density uniform, and thus generation of bright lines can be suppressed. Further, since incident points P are dispersedly located over the whole concave arc, the difference in emission intensity between a bright portion and a dark portion is lessened.

According to the description above, when the light from a light emitting device of a resin mold type with a relatively wide directivity is directly incident on flat incident plane 35, bright lines and bright/dark portions are generated. In contrast, in the case where incident end face 35 is concave-arc-shaped, generation of bright lines and bright/dark portions is suppressed, so that the emission intensity can be made uniform.

Figure 4A:
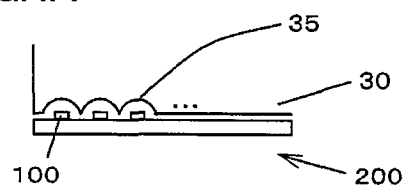
FIGS. 4A and 4B are partial views showing respective structures of surface light sources in first and second modifications of the first embodiment of the present invention.

While FIG. 3A shows an arrangement where array light source 200 and incident tangent plane 37 abut on each other and light emitting device 100 is provided inside the concave arc of incident end face 35, the arrangement is not necessarily limited to this. For example, as shown in FIG. 4A, light emitting device 100 may be disposed such that a part of the device is located inside the concave arc, or light emitting device 100 may be disposed apart from incident end face 35.

Figure 4B:
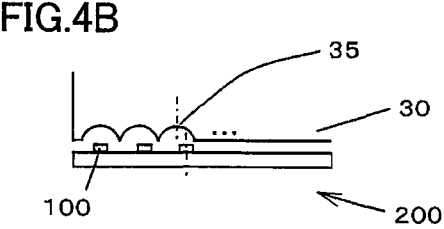

Further, while FIG. 3A shows an arrangement where the intervals at which light emitting devices 100 are arranged and the intervals at which concave arcs of incident end face 35 are formed are identical, and the devices and the concave arcs face each other respectively, the arrangement is not necessarily limited to this. For example, as shown in FIG. 4B, the optical axis of light emitting device 100 and the center line of the concave arc of incident end face 35 may be displaced from each other. In this case, although the trajectories of light are not symmetrical, the effect of suppressing bright lines and bright/dark portions can be achieved.

Further, incident end face 35 may be rough-surfaced to achieve the effect of suppressing bright lines and bright/dark portions as well.

Another effect of this surface light source is a high light use efficiency.

Figure 8:
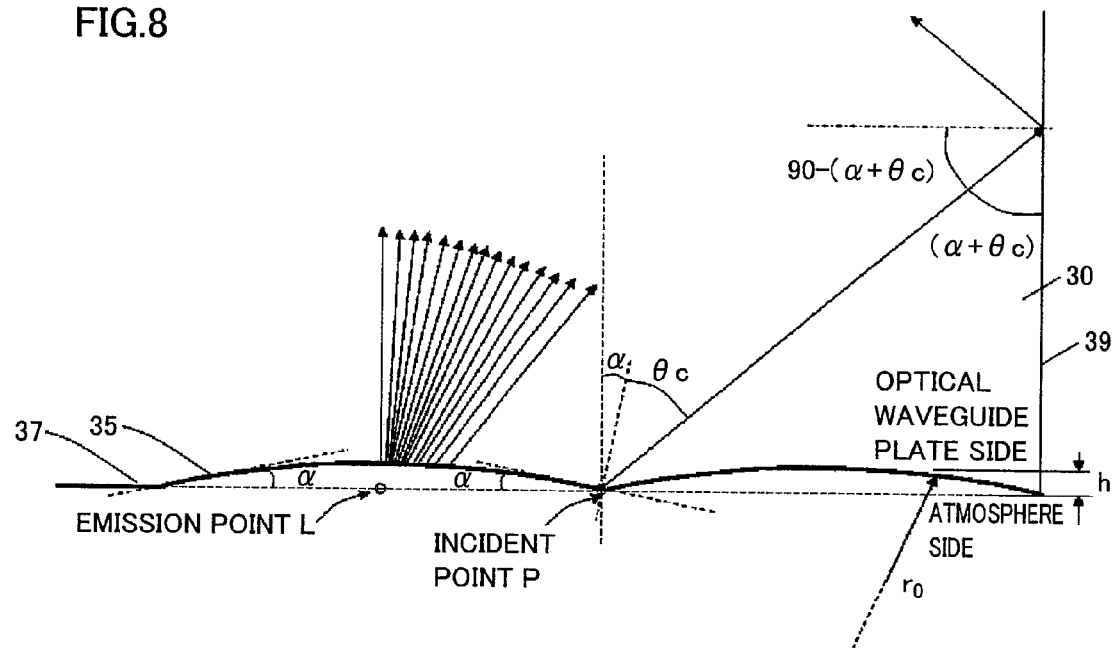
FIG. 8 is a diagram illustrating trajectories of light traveling between an incident end face and a reflection side surface.

Referring to FIG. 8, if depth h is increased relative to radius of curvature r0 of the arc, the light is incident with an angle closer to the right angle with respect to reflection side surface 39 and the condition for total internal reflection is not satisfied. Therefore, the light leaks through this portion into the atmosphere. Thus, depth h can be set appropriately with respect to radius of curvature r0 such that the total internal reflection of the light occurs on reflection side surface 39 and the light travels within the optical waveguide plate so as to enhance the light use efficiency.

As for a design satisfying the condition that the total internal reflection of the light in the optical waveguide plate occurs on reflection side surface 39, it is preferable to set the angle formed by incident tangent plane 37 and the tangent of the arc at the intersection of the arc and incident tangent plane 37 for example to (90−2·θc) degree. A reason therefor will be described below.

In FIG. 8, it is supposed that the point of intersection of incident end face 35 having the concave arc shape and incident tangent plane 37 is incident point P, and the angle formed by the tangent plane of the concave arc and incident tangent plane 37 is α. In the case where the condition under which the total internal reflection occurs on reflection side surface 39 is to be determined, it is sufficient to consider the trajectory of light incident on reflection side surface 39 at an angle closest to the right angle. Therefore, the trajectory of light incident on incident point P will be considered.

The light incident with the largest angle of incidence on incident point P travels in optical waveguide plate 30 with an angle of (α+θc) degree with respect to the normal to incident tangent plane 37, and reaches reflection side surface 39 with an angle of incidence of 90−(α+θc) degree.

The condition under which the total internal reflection of the light traveling in optical waveguide plate 30 occurs on reflection side surface 39 is that this angle of incidence is larger than critical angle θc:

90−(α+θc)>θc (degree), which is rearranged to (90−2·θc)>α (degree).

Here the light incident on incident point P with the largest angle of incidence is the light incident along the surface of the concave arc. In the actual surface light source, however, emission point L is located further apart from the concave arc. Therefore, the value of α may be somewhat larger than the above-described one.

Accordingly, the light incident on incident end face 35 is expanded by the concave arc to reach reflection side surface 39, where the total internal reflection of the light occurs so that the light again travels in the optical waveguide plate. Therefore, the light use efficiency is high.

Second Embodiment

Figure 9A:
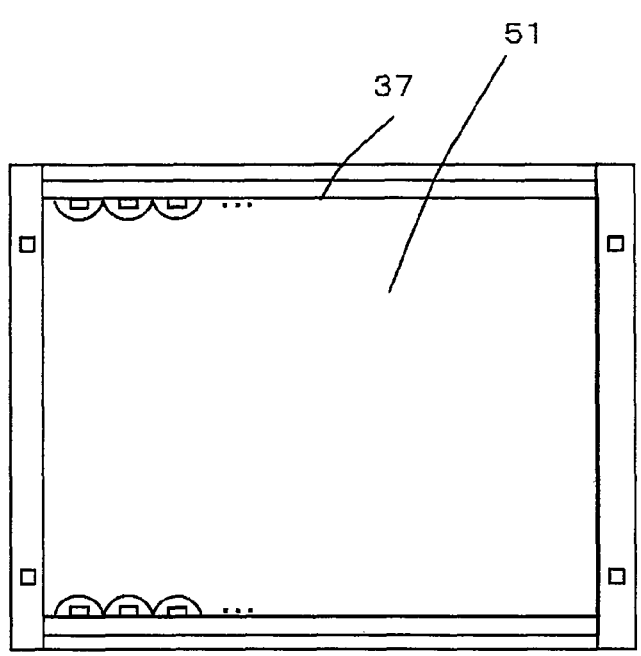
FIGS. 9A to 9C are each a cross-sectional view of a liquid crystal display in a second embodiment of the present invention.
Figure 9C:
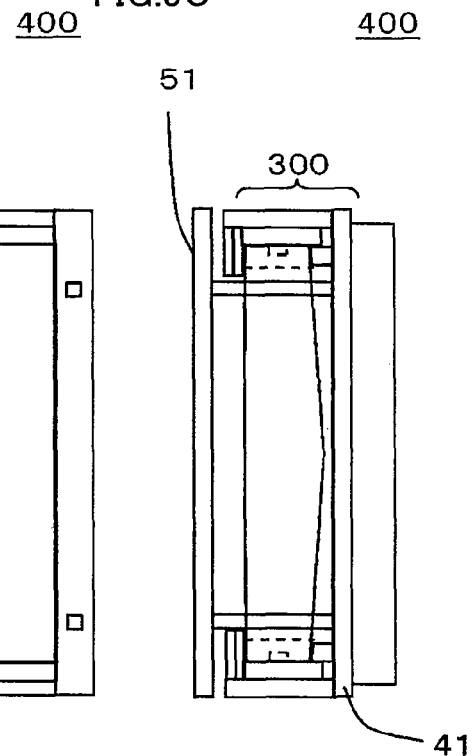
Figure 9B:
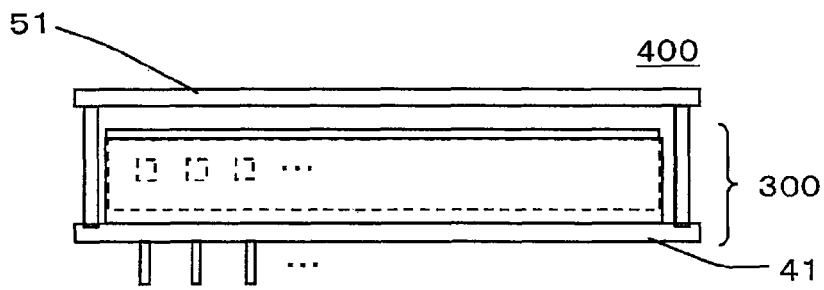

Referring to FIGS. 9A to 9C, a liquid crystal display 400 is configured to include surface light source 300 and a liquid crystal display panel 51 provided directly above the surface light source, which illuminates the panel from behind. Liquid crystal display 400 thus includes surface light source 300 so that an excellent display with less unevenness in emission intensity can be provided. In particular, in the vicinity of incident tangent plane 37, unevenness in emission intensity is small. Moreover, low power consumption can also be achieved.

Third Embodiment

Figure 10A:
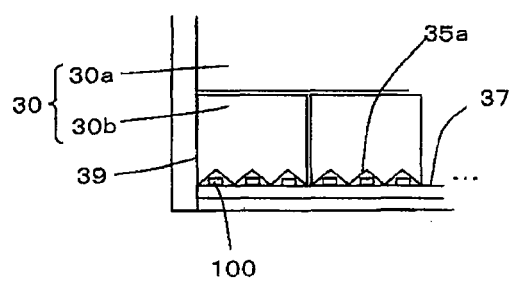
FIGS. 10A and 10B are each a diagram showing the vicinity of an incident end face of a surface light source in a third embodiment of the present invention.
Figure 10B:
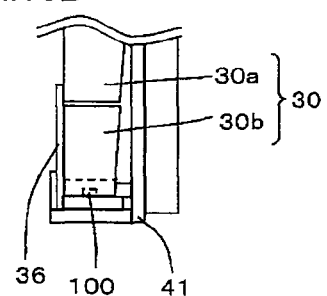

Referring to FIGS. 10A and 10B, a feature of the present embodiment is that an optical waveguide plate 30 is formed of an optical waveguide plate 30a including the center line and a plurality of optical waveguide plates 30b including an incident end face 35a that are separated from each other with a gap therebetween. Further, on an incident tangent plane 37 of optical waveguide plate 30b, triangular incident end face 35a is formed instead of incident end face 35 whose cross section is concave-arc-shaped. Preferably, a reflection member 36 is included to cover the gap between optical waveguide plates 30a and 30b.

The direction of travel of the light emitted from a light emitting device 100 is bent by optical waveguide plate 30b, and the light is incident on the end face of optical waveguide plate 30a via the gap directly or after reflected by reflection member 36.

In the case where the ambient temperature of surface light source 300 changes, optical waveguide plate 30 and mounting substrate 21 (FIG. 2B) where a plurality of light emitting devices 100 are mounted change in dimension due to a difference between respective coefficients of linear expansion, so that a positional displacement could occur between light emitting device 100 and incident end face 35. The presence of the gap of optical waveguide plate 30, however, can absorb the dimensional change. Further, since the total internal reflection occurs at respective reflection side surfaces of a plurality of optical waveguide plates 30b, there is a small influence of leakage of light from the gap portion.

Further, the angle of inclination of triangular incident end face 35a with respect to incident tangent plane 37 is preferably set to (90−2·θc) degree for a similar reason to the one in the case where concave-arc-shaped incident end face 35 is formed.

The separation of optical waveguide plate 30 into optical waveguide plates 30a and 30b and the formation of incident end face 35a on incident tangent plane 37 may be implemented simultaneously or one of them may be implemented.

Further, the light use efficiency can be enhanced by providing a structure in which optical waveguide plate 30a includes scattering particles while optical waveguide plates 30b do not include scattering particles. Triangular incident end face 35a is formed to satisfy the condition that the total internal reflection of the incident light occurs on reflection side surface 39. Although the scattering particles serve to allow the emission light to be extracted by scattering the light in the optical waveguide plate, a part of the light does not satisfy the condition for the total internal reflection on reflection side surface 39, and accordingly the light could leak into the atmosphere. Therefore, in some cases, it is preferable that optical waveguide plates 30b do not include scattering particles.

As for manufacture of optical waveguide plate 30, since optical waveguide plates 30b having the complicated shape like incident end face 35a and optical waveguide plate 30a having the relatively simple shape are separately provided, the manufacture is facilitated. For example, optical waveguide plates 30b having a small size and a complicated cross-sectional shape may be manufactured separately from optical waveguide plate 30a, which is advantageous in terms of improvements of the machining accuracy and the manufacturing yield.

Example 1

Referring to FIG. 5A, the present example is an example of the surface light source having a plurality of successive concave arcs on incident end face 35 of optical waveguide plate 30.

On incident tangent plane 37 (FIG. 3A), incident end face 35 having a plurality of successive concave arcs is formed, and the interval between concave arcs adjacent to each other is 9 mm. The arc has a radius of curvature of r0=20.59 mm and a depth of h=0.5 mm. The material for optical waveguide plate 30 is polycarbonate whose refractive index is n=1.59 and critical angle is θc=39 degrees. Therefore, the optical waveguide plate is formed such that the angle formed by incident tangent plane 37 and a tangent line of the arc is (90−2·θc)=12 degrees or less.

In the above-described optical waveguide plate, the total internal reflection of the light traveling in optical waveguide plate 30 occurs on reflection side surface 39, so that the light travels again in optical waveguide plate 30. Therefore, the light use efficiency is high. Further, there is a small unevenness of the emission intensity in the vicinity of incident tangent plane 37.

Example 2

Figure 11:
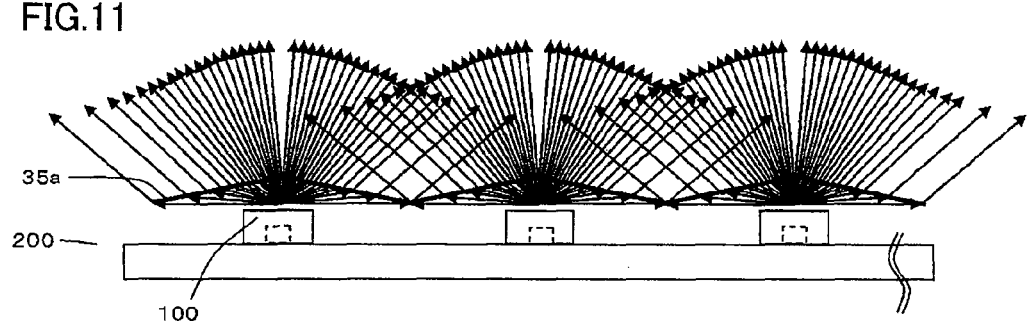
FIG. 11 is a diagram illustrating trajectories of light in Example 2 of the present invention.

Referring to FIG. 11, the present example is an example of the surface light source having a plurality of successive triangular portions on incident end face 35a of optical waveguide plate 30.

On incident tangent plane 37 (FIG. 3A), incident end face 35a having a plurality of successive triangular portions is formed, and the interval between triangular portions adjacent to each other is 9 mm, and the depth is h=0.96 mm. The material for optical waveguide plate 30 is polycarbonate whose refractive index is n=1.59 and critical angle is θc=39 degrees. Therefore, the optical waveguide plate is formed such that the angle formed by incident tangent plane 37 and incident end face 35a is (90−2·θc)=12 degrees or less. With this structure, the functions and effects equivalent to those of Example 1 can be obtained as well.

Example 3

Figure 12A:
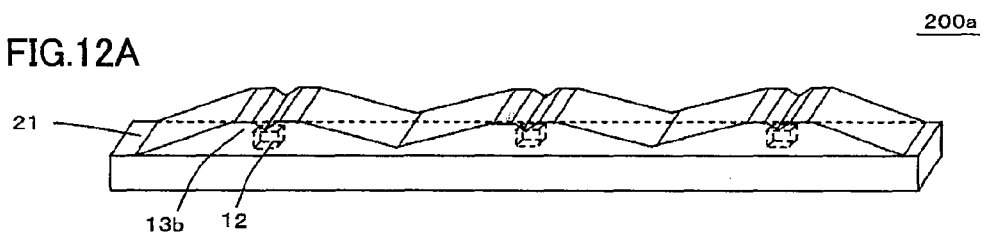
FIGS. 12A and 12B are diagrams showing a linear light source and the vicinity of an incident end face of a surface light source including the linear light source in Example 3 of the present invention.
Figure 12B:
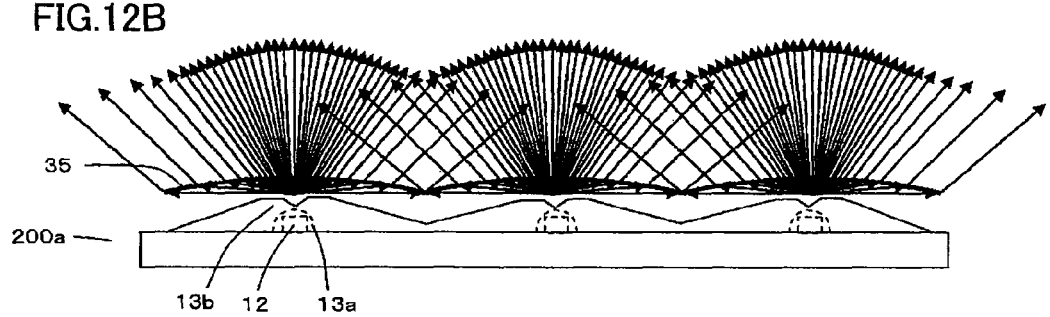

Referring to FIGS. 12A and 12B, the present example has a feature that a linear light source 200a is included instead of array light source 200 described in the first embodiment. In the following, the description of the same components as those described in the first embodiment will not be repeated, and different components will be described.

Linear light source 200a includes a plurality of chips 12 that are die-bonded onto a mounting substrate 21, a resin 13a individually covering the chips and a resin 13b that entirely covers these components. In resin 13a, a phosphor 14 (not shown) is dispersed. The linear light source is formed such that a primary light is emitted from chip 12 and the primary light is partially absorbed by phosphor 14 that then emits a secondary light, and the primary light and the secondary light are mixed and accordingly a white light is emitted.

Further, the surface of resin 13b has concave portions whose cross sections are V-shaped, directly above chips 12 and between the chips adjacent to each other. Thus, the uniformity in emission intensity in the longitudinal direction is improved. Here, resin 13b is provided for obtaining the function of the optical waveguide and thus phosphor 14 may not be dispersed in resin 13b.

In surface light source 300, incident end face 35 and the light exit surface of linear light source 200 are disposed opposite to each other. With this structure as well, the functions and effects equivalent to those of Example 1 can be obtained.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A surface light source comprising:
   a light source for emitting light; and
   an optical waveguide plate having an incident end face where the light is incident and a light exit surface where the light incident on the incident end face exits, and having a refractive index n, wherein
   the incident end face has a plurality of concave portions, and
   an angle formed by a tangent plane of the incident end face and a tangent of each of the concave portions at an intersection of the concave portion and the tangent plane is not more than (90−2·arcsin(1/n)) degrees.

2. The surface light source according to claim 1, wherein the light source is provided at a position apart from the optical waveguide plate, with respect to the tangent plane.

3. The surface light source according to claim 1, wherein each of the concave portions has an arc-like shape.

4. The surface light source according to claim 1, wherein each of the concave portions has a triangle shape.

5. A liquid crystal display comprising:
   the surface light source as recited in claim 1; and
   a liquid crystal display panel having a rear surface illuminated by the surface light source.

* * * * *